United States Patent
Oshima (10) Patent No.: US 10,642,034 B2
(45) Date of Patent: May 5, 2020

(54) PROJECTION TYPE DISPLAY DEVICE, CONTROL METHOD OF PROJECTION TYPE DISPLAY DEVICE, CONTROL PROGRAM OF PROJECTION TYPE DISPLAY DEVICE

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/445,217

(22) Filed: Jun. 19, 2019

(65) Prior Publication Data

US 2019/0302453 A1 Oct. 3, 2019

Related U.S. Application Data

(63) Continuation of application No. PCT/JP2017/037545, filed on Oct. 17, 2017.

(30) Foreign Application Priority Data

Dec. 21, 2016 (JP) ................................ 2016-248112

(51) Int. Cl.
*G02B 27/01* (2006.01)
*G03B 21/00* (2006.01)
(Continued)

(52) U.S. Cl.
CPC .......... *G02B 27/0101* (2013.01); *B60R 11/02* (2013.01); *G02B 27/01* (2013.01);
(Continued)

(58) Field of Classification Search
CPC ......... G06T 3/20; B60R 11/02; H04N 9/3102; B60Y 2200/412; G03B 21/00;
(Continued)

(56) References Cited

U.S. PATENT DOCUMENTS

2002/0141077 A1  10/2002  Nakamura et al.
2010/0066832 A1  3/2010  Nagahara et al.
(Continued)

FOREIGN PATENT DOCUMENTS

JP    2002293161    10/2002
JP    2010070066    4/2010
(Continued)

OTHER PUBLICATIONS

"International Search Report (Form PCT/ISA/210) of PCT/JP2017/037545," dated Nov. 28, 2017, with English translation thereof, pp. 1-5.
(Continued)

*Primary Examiner* — Jacinta M Crawford
(74) *Attorney, Agent, or Firm* — JCIPRNET (57) ABSTRACT

Provided are a projection type display device, a control method of a projection type display device, and a control program of a projection type display device, capable of being continuously used even in a case where a vehicle vibrates, and performing optimal display depending on the vibration. An HUD 100 includes a projection display section 50 that projects image light obtained by spatially modulating light emitted from a light source onto a combiner 12 to display a virtual image, a first vibration detector 61 that detects a first vibration of the combiner 12, a second vibration detector 62 that detects a second vibration of the projection display section 50, a third vibration detector 63 that detects a third vibration of the projection display section 50 with respect to the combiner 12 on the basis of the first vibration and the second vibration, and a display controller 64 that controls the image to be displayed by the projection display section 50. The display controller 64 changes a display format of content to be displayed by the projection display section 50 on the basis of the third vibration.

19 Claims, 8 Drawing Sheets

(51) Int. Cl.
*G06T 3/20* (2006.01)
*H04N 9/31* (2006.01)
*G03B 21/10* (2006.01)
*B60R 11/02* (2006.01)
*B60K 35/00* (2006.01)

(52) U.S. Cl.
CPC ......... *G02B 27/0179* (2013.01); *G03B 21/00* (2013.01); *G03B 21/10* (2013.01); *G06T 3/20* (2013.01); *H04N 9/3102* (2013.01); *B60K 35/00* (2013.01); *B60K 2370/1529* (2019.05); *B60K 2370/52* (2019.05); *B60Y 2200/412* (2013.01); *G02B 2027/011* (2013.01); *G02B 2027/0183* (2013.01)

(58) Field of Classification Search
CPC ..................... G03B 21/10; B60K 35/00; B60K 2370/1529; B60K 2370/52; G02B 27/01; G02B 27/0101; G02B 27/0179; G02B 2027/011; G02B 2027/0183

USPC .................................................. 345/7, 8, 418
See application file for complete search history.

(56) References Cited

U.S. PATENT DOCUMENTS

2016/0147073 A1    5/2016   Onda et al.
2016/0371813 A1*  12/2016   Fujie .................... B60W 50/14

FOREIGN PATENT DOCUMENTS

| JP | 2015009677 | 1/2015 |
| JP | 2016193723 | 11/2016 |

OTHER PUBLICATIONS

"Written Opinion of the International Searching Authority (Form PCT/ISA/237) of PCT/ JP2017/037545," dated Nov. 28, 2017, with English translation thereof, pp. 1-7.

* cited by examiner

PROJECTION TYPE DISPLAY DEVICE, CONTROL METHOD OF PROJECTION TYPE DISPLAY DEVICE, CONTROL PROGRAM OF PROJECTION TYPE DISPLAY DEVICE

CROSS REFERENCE TO RELATED APPLICATION

This is a continuation of International Application No. PCT/JP2017/037545 filed on Oct. 17, 2017, and claims priority from Japanese Patent Application No. 2016-248112 filed on Dec. 21, 2016, the entire disclosures of which are incorporated herein by reference.

BACKGROUND OF THE INVENTION

1. Field of the Invention

The present invention relates to a projection type display device, a control method of the projection type display device, and a computer readable medium storing a control program of the projection type display device.

2. Description of the Related Art

A vehicle head-up display (HUD) that projects, using a windshield in a variety of vehicles such as an automobile, a train, a ship, a construction machine, an aircraft, or an agricultural machine, or a combiner disposed in the vicinity of the windshield as a screen, light onto the screen to display an image is known (see JP2015-009677A and JP2016-193723A). According to the HUD, it is possible to cause a driver to visually recognize an image based on light projected from the HUD as a real image on a screen or a virtual image in front of the screen.

JP2015-009677A discloses an HUD that projects image light onto a windshield of a vehicle to perform display. The HUD increases the size of display content in a case where vibration of the vehicle is large, to enhance visibility during the vibration.

JP2016-193723A discloses an HUD that projects image light onto a combiner disposed in a vehicle to perform display. The HUD sets the combiner to a closed state to stop display of an image in a case where vibration of the vehicle is large, to secure forward visibility.

SUMMARY OF THE INVENTION

In an HUD for displaying an image using a combiner provided in a vehicle, an installation position of the combiner in the vehicle and an installation position of a unit that projects image light of the HUD are different from each other. Further, the combiner is formed in a thin plate shape, and vibrates more easily than in the unit that projects the image light. Accordingly, a possibility that a combiner vibration and a unit vibration due to the vibration of the vehicle are not the same is high. In a case of a working machine such as a heavy machine, a construction machine, or an agricultural machine, since a vehicle frequently vibrates, a difference between the combiner vibration and the unit vibration becomes extremely large.

The HUD disclosed in JP2015-009677A controls the size of display content on the basis of a relative vibration of the vehicle with respect to a different vehicle, but in a case where image light is projected to the combiner, since the combiner and the unit separately vibrate, there is a case where it is not necessary to change the size of the display content. For example, even though the vehicle vibrates with respect to the different vehicle, there is a case where shaking of the unit for the combiner is small with respect to the different vehicle. In such a case, it is not necessary to change the display.

In the HUD disclosed in JP2016-193723A, in a case where the vibration of the vehicle is large, display of an image is stopped, for example, in a vehicle in which it is presumed that a vehicle body is severely shaking as in the working machine, the HUD cannot be nearly used.

In consideration of the above-mentioned problems, an object of the invention is to provide a projection type display device, a control method of the projection type display device, and a computer readable medium storing a control program of the projection type display device, capable of continuously using a vehicle in a case where the vehicle vibrates, and capable of performing optimal display depending on the vibration.

According to an aspect of the invention, there is provided a projection type display device comprising: a projection display section that includes a light modulator that spatially modulates light emitted from a light source on the basis of input image information, and projects image light obtained through spatial modulation using the light modulator onto a combiner that is provided in a vehicle to display an image based on the image light; a first vibration detector that detects a first vibration of the combiner; a second vibration detector that detects a second vibration of the projection display section; a third vibration detector that detects a third vibration of the projection display section with respect to the combiner on the basis of the first vibration and the second vibration; and a display controller that controls the image information input to the light modulator to control the image to be displayed by the projection display section, in which the display controller changes a display format of content to be displayed by the projection display section on the basis of the third vibration.

According to another aspect of the invention, there is provided a control method of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, the method comprising: a first vibration detection step of detecting a first vibration of the combiner; a second vibration detection step of detecting a second vibration of the projection display section; a third vibration detection step of detecting a third vibration of the projection display section with respect to the combiner on the basis of the first vibration and the second vibration; and a display control step of controlling the image information input to the light modulator to control the image to be displayed by the projection display section, in which in the display control step, a display format of content to be displayed by the projection display section is changed on the basis of the third vibration.

According to still another aspect of the invention, there is provided a non-transitory computer readable medium storing a control program of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, the control program causing a computer to execute: a first vibration detection step of detecting a first vibration of the combiner; a second vibration detection step of detecting a second vibration of the projection display section; a third vibration detection step of detecting a third vibration of the projection display section with respect to the combiner on the basis of the first vibration and the second vibration; and a display control step of controlling the image information input to the light modulator to control the image to be displayed by the projection display section, in which in the display control step, a display format of content to be displayed by the projection display section is changed on the basis of the third vibration.

According to the invention, it is possible to provide a projection type display device, a control method of the projection type display device, and a computer readable medium storing a control program of the projection type display device, capable of continuously using a vehicle in a case where the vehicle vibrates, and capable of performing optimal display depending on the vibration.

DESCRIPTION OF THE PREFERRED EMBODIMENTS

Hereinafter, embodiments of the invention will be described with reference to the accompanying drawings.

Figure 1:
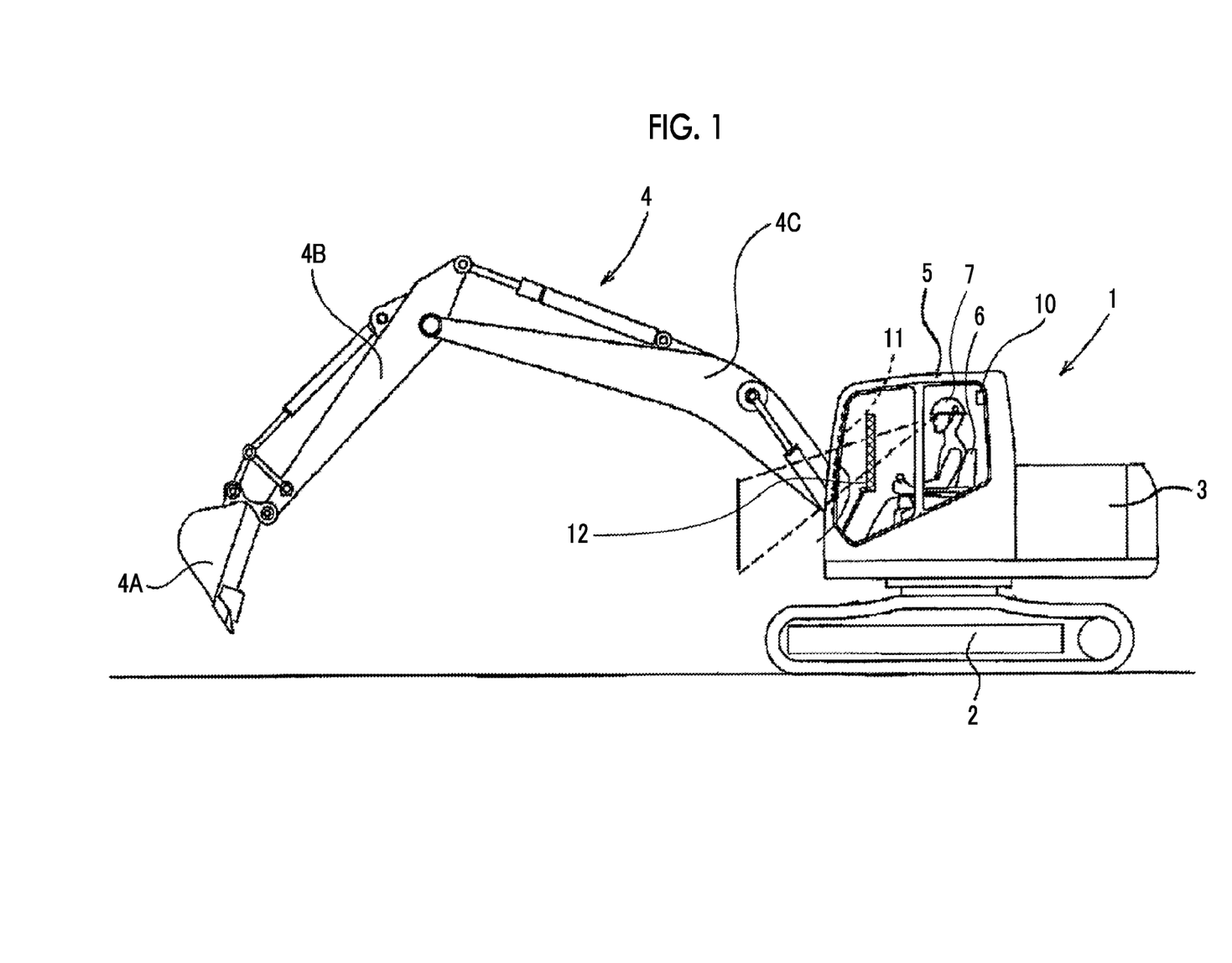
FIG. 1 is a schematic diagram showing a configuration of a construction machine 1 in which an HUD 100 that is a projection type display device according to an embodiment of the invention is mounted.

FIG. 1 is a schematic diagram showing a configuration of a construction machine 1 in which an HUD 100 that is a projection type display device according to a first embodiment of the invention is mounted.

The construction machine 1 is a hydraulic excavator, which includes respective parts of a lower traveling body 2, an upper revolving body 3 that is supported by the lower traveling body 2 to be revolved, a front working part 4 that is supported by the upper revolving body 3, and the like. The lower traveling body 2 and the upper revolving body 3 form a main part of the construction machine 1.

The lower traveling body 2 includes a metallic or rubber crawler for traveling a public road and a workplace.

The upper revolving body 3 includes an operator cab 5 in which an operating device for operating the front working part 4 and a cab seat 6 on which an operator is seated are provided.

In the operator cab 5, a front windshield 11 is provided in front of the cab seat 6 where an operator 7 is seated, and a combiner 12 is provided between the front windshield 11 and the cab seat 6.

A projection unit 10 that forms a projection type display device is provided in the operator cab 5, and causes the operator 7 who sits on the cab seat 6 to visually recognize a virtual image in front of the combiner 12 using image light projected onto the combiner 12.

The front working part 4 includes an arm 4C that is movably supported by the upper revolving body 3 in a gravity direction and a direction (a vertical direction in the figure) perpendicular to the gravity direction, a boom 4B that is supported by the arm 4C to be rotatable with respect to the arm 4C, and a bucket 4A that is supported by the boom 4B to be rotatable with respect to the boom 4B. The bucket 4A is a part that is directly in contact with a working target such as a ground surface or a discharge, and forms a working tool.

A configuration in which a different working tool such as a steel cutter, a concrete crusher, a gripper, or a percussion type crushing tool, instead of the bucket 4A, is mounted in the boom 4B may be used.

The bucket 4A may be moved in the vertical direction in the figure with respect to the operator cab 5 through the arm 4C and the boom 4B. Further, the bucket 4A is rotatable using a direction (a direction vertical to a sheet plane in the figure) perpendicular to a sight direction of the operator who sits on the cab seat 6 and the gravity direction as an axis. Further, the boom 4B is rotatable using the direction vertical to the sheet plane in the figure as an axis.

Figure 2:
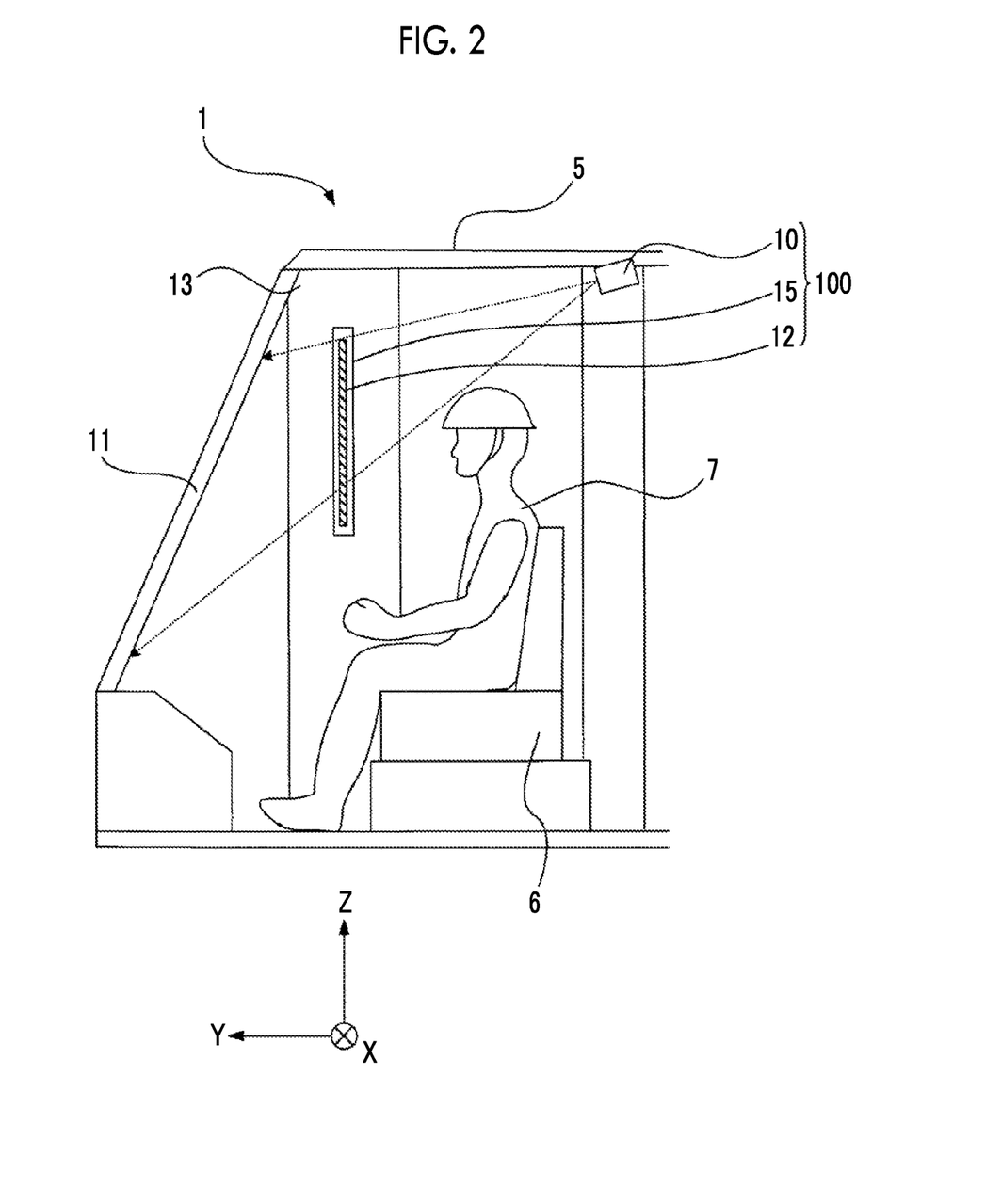
FIG. 2 is a schematic diagram showing an example of an internal configuration of an operator cab 5 in the construction machine 1 shown in FIG. 1.

FIG. 2 is a schematic diagram showing an example of an internal configuration of the operator cab 5 in the construction machine 1 shown in FIG. 1.

As shown in FIG. 2, the HUD 100 includes a projection unit 10, a combiner mounting part 15, and the combiner 12. The combiner mounting part 15 is fixed to a right side pillar 13 of the operator cab 5. The combiner 12 is attachably and detachably provided in the combiner mounting part 15.

The projection unit 10 is provided on an upper and rear side of the operator 7 in a state where the operator 7 sits on the cab seat 6, and projects image light onto the combiner 12 mounted in the combiner mounting part 15.

The operator 7 of the construction machine 1 can view image light that is projected onto the combiner 12 that is mounted in the combiner mounting part 15 and is reflected therefrom to visually recognize information on an icon, a text, or the like for supporting an operation of the construction machine 1 as a virtual image. Further, the combiner 12 has a function of reflecting the image light projected from the projection unit 10 and transmitting light from the outside (outside world). Accordingly, the operator can visually recognize the virtual image based on the image light projected from the projection unit 10 and an outside scene in an overlapping manner.

In the example shown in FIG. 1, and the HUD 100 is mounted in a hydraulic excavator, but the HUD 100 may be similarly mounted in a vehicle such as an automobile, an aircraft, a train, or a ship, as well as a working machine (for example, a wheel loader, a bulldozer, a motor grader, a forklift, a tracker, or the like) in which a working tool capable of being operated by an operator is mounted in front of the cab seat 6.

As shown in FIG. 2, a front direction (a movement direction in a case where the lower traveling body 2 moves forward) of the cab seat 6 in the operator cab 5 is referred to as a second direction Y, a direction vertical to the seat of the cab seat 6 is referred to as a third direction Z, and a direction that is vertical to both of the second direction Y and the third direction Z is referred to as a first direction X.

Figure 3:
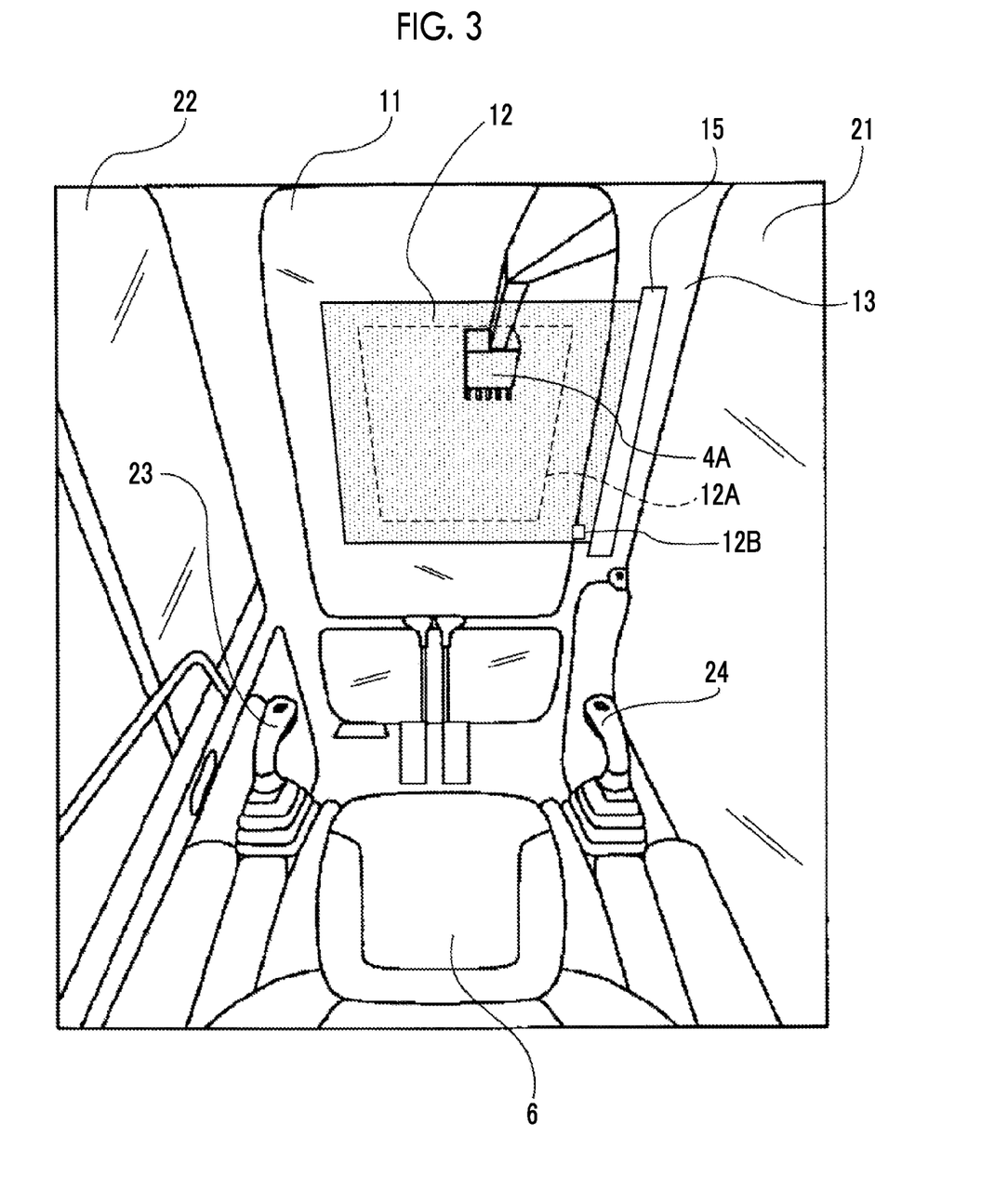
FIG. 3 is a schematic diagram showing a state where a front windshield 11 is seen from a cab seat 6 of the operator cab 5 in the construction machine 1 shown in FIG. 1.

FIG. 3 is a schematic diagram showing a state where the front windshield 11 is seen from the cab seat 6 of the operator cab 5 in the construction machine 1 shown in FIG. 1.

The operator cab 5 is surrounded by the front windshield 11, a right side windshield 21, and a left side windshield 22. The operator cab 5 includes a left operation lever 23 for operating bending and stretching of the front working part 4 and revolution of the upper revolving body 3, a right operation lever 24 for operating drilling and opening of the bucket 4A of the front working part 4, and the like, around the cab seat 6.

Allocation of operational functions to the left operation lever 23 and the right operation lever 24 is an example, and the invention is not limited thereto. The left operation lever 23 and the right operation lever 24 form an operation member for performing operations of the bucket 4A such as movement of the bucket 4A, drilling using the bucket 4A, and opening of the bucket 4A.

The right side pillar 13 is provided between the front windshield 11 and the right side windshield 21, and the combiner mounting part 15 is fixed to the right side pillar 13. In FIG. 3, a projection range 12A in which image light projected from the projection unit 10 is incident is shown in the combiner 12.

Further, a triaxial acceleration sensor 12B is fixed to the combiner 12. The triaxial acceleration sensor 12B detects an acceleration of the combiner 12 in the first direction X, an acceleration of the combiner 12 in the second direction Y, and an acceleration of the combiner 12 in the third direction Z, respectively.

Figure 4:
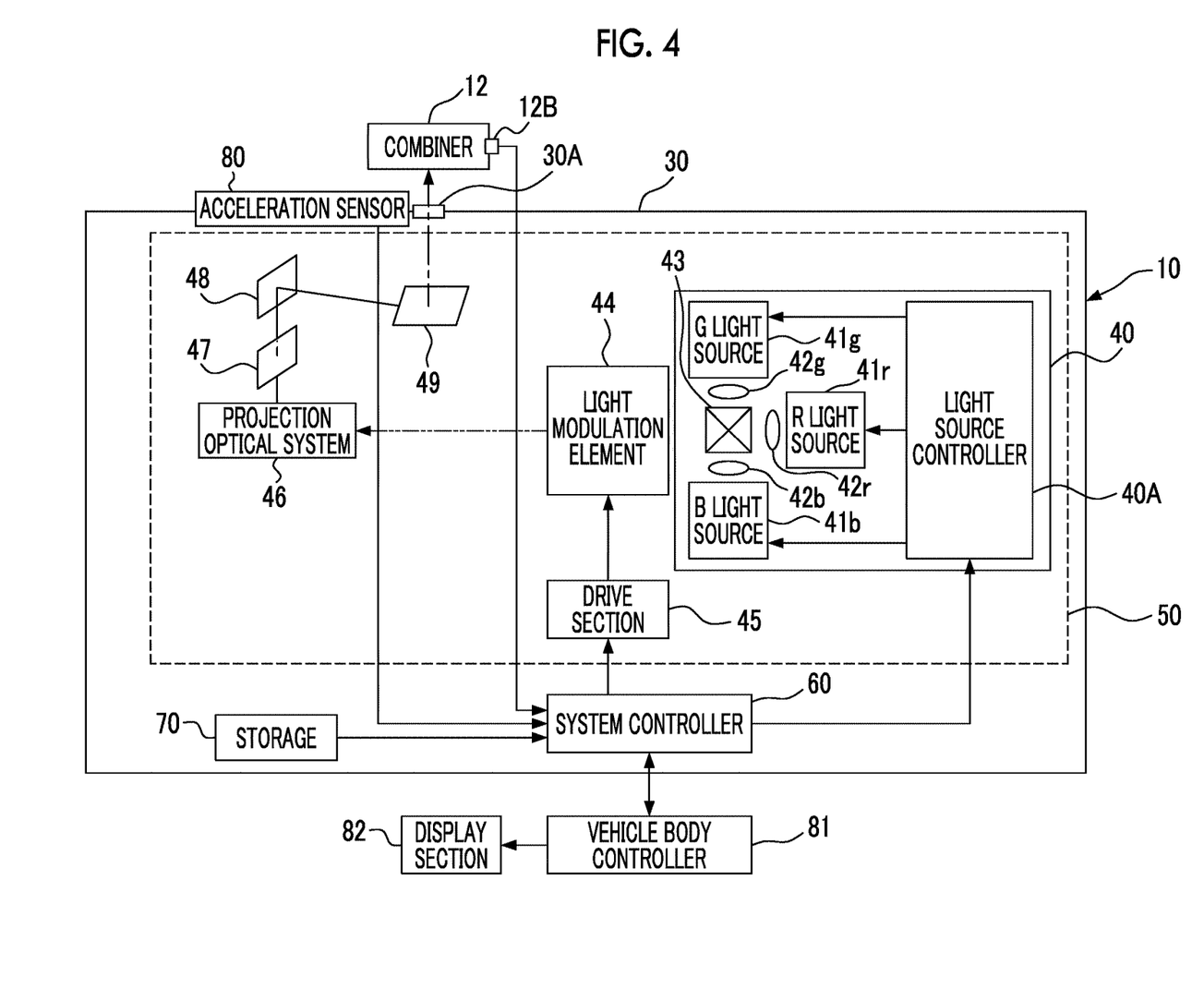
FIG. 4 is a schematic diagram showing an internal configuration of a projection unit 10 shown in FIGS. 1 and 2.

FIG. 4 is a schematic diagram showing an internal configuration of the projection unit 10 shown in FIGS. 1 and 2.

The projection unit 10 includes a light source unit 40, a light modulation element 44, a drive section 45 that drives the light modulation element 44, a projection optical system 46, a diffuser 47, a reflecting mirror 48, a magnifier 49, a system controller 60 that controls the light source unit 40 and the drive section 45, a storage 70 configured of a storage medium such as a flash memory, a housing 40 that contains the above-mentioned components, and a triaxial acceleration sensor 80 fixed to the housing 40.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, and a collimator lens 42b that is provided between the B light source 41b and the dichroic prism 43.

The dichroic prism 43 is an optical member for guiding light emitted from each of the R light source 41r, the G light source 41g, and the B light source 41b to the same optical path. That is, the dichroic prism 43 transmits red light that is collimated by the collimator lens 42r to be output to the light modulation element 44. Further, the dichroic prism 43 reflects green light that is collimated by the collimator lens 42g to be output to the light modulation element 44. In addition, the dichroic prism 43 reflects blue light that is collimated by the collimator lens 42b to be output to the light modulation element 44. An optical member having such a function is not limited to a dichroic prism. For example, a cross dichroic mirror may be used.

The R light source 41r, the G light source 41g, and the B light source 41b may respectively employ a light emitting element such as a laser or a light emitting diode (LED). The R light source 41r, the G light source 41g, and the B light source 41b form light sources of the HUD 100. In this embodiment, the light sources of the HUD 100 are configured to include three light sources of the R light source 41r, the G light source 41g, and the B light source 41b, but the number of light sources may be 1, 2, or 4 or more.

The light source controller 40A sets the intensity of light emitted from each of the R light source 41r, the G light source 41g, and the B light source 41b to a predetermined light intensity pattern, and performs a control for sequentially emitting light from the R light source 41r, the G light source 41g, and the B light source 41b according to the light intensity patterns.

The light modulation element 44 spatially modulates light that is emitted from the dichroic prism 43 on the basis of image information, and emits the spatially modulated light (red color image light, blue color image light, and green color image light) to the projection optical system 46.

The light modulation element 44 may employ, for example, a liquid crystal on silicon (LCOS), a digital micromirror device (DMD), a micro electro mechanical systems (MEMS) element, a liquid crystal display device, or the like.

The drive section 45 drives the light modulation element 44 on the basis of image information input from the system controller 60, and causes light (red color image light, blue color image light, and green color image light) based on the image information to be output to the projection optical system 46.

The light modulation element 44 and the drive section 45 form a light modulator of the HUD 100.

The projection optical system 46 is an optical system that projects light emitted from the light modulation element 44 of the light source unit 40 to the diffuser 47. The optical system is not limited to a lens, and may employ a scanner. For example, light emitted from a scan type scanner may be diffused by the diffuser 47 to become a plane light source.

The reflecting mirror 48 reflects the light diffused by the diffuser 47 toward the magnifier 49.

The magnifier 49 magnifies an image based on the light reflected from the reflecting mirror 48 to be projected in the projection range 12A.

The light source unit 40, the light modulation element 44, the drive section 45, the projection optical system 46, the diffuser 47, the reflecting mirror 48, and the magnifier 49 form a projection display section 50 that spatially modulates light emitted from the R light source 41r, the G light source 41g, and the B light source 41b on the basis of image information input from the system controller 60 and projects image light obtained through the spatial modulation onto the combiner 12 mounted in the combiner mounting part 15 to display a virtual image based on the image light.

The projection display section 50, the system controller 60, and the storage 70 are contained in the housing 30, and an opening 30A for emitting the image light from the magnifier 49 is provided in a part of the housing 30.

The triaxial acceleration sensor 80 is fixed in the vicinity of the opening 30A of the housing 30, and detects an acceleration in the first direction X, an acceleration in the second direction Y, and an acceleration in the third direction Z, respectively. The projection display section 50 is supported by the housing 30. Accordingly, it is possible to respectively detect the acceleration in the first direction X, the acceleration in the second direction Y, and the acceleration in the third direction Z of the projection display section 50 using the triaxial acceleration sensor 80.

The system controller 60 controls the light source controller 40A and the drive section 45 so that image light based on image information is emitted to the diffuser 47 through the projection optical system 46.

The diffuser 47, the reflecting mirror 48, and the magnifier 49 shown in FIG. 4 are optically designed so that an image based on image light projected onto the combiner 12 can be visually recognized as a virtual image at a position in front of the combiner 12.

The system controller 60 is configured of a variety of processors as main components, and includes a read only memory (ROM) in which a program for executing the processors is stored, a random access memory (RAM) that is a work memory, and the like.

The variety of processors includes a central processing unit (CPU) that is a general-purpose processor that performs a variety of processes by executing a program, a programmable logic device (PLD) that is a processor capable of changing a circuit configuration after manufacturing, such as a field programmable gate array (FPGA), an exclusive electric circuit that is a processor that has a circuit configuration that is exclusively designed for executing a specific process, such as an application specific integrated circuit (ASIC), or the like.

A structure of the variety of processors is, more specifically, an electric circuit in which circuit elements such as semiconductor devices are combined.

A processor of the system controller 60 may be configured as one processor among a variety of processors, or may be configured as a combination of the same kind or different kinds of two or more processors (for example, a combination of a plurality of FPGAs or a combination of a CPU and an FPGA).

The storage 70 stores work support information and different relevant information. The work support information refers to information that is displayed in the vicinity of the bucket 4A that is frequently watched by an operator during work and supports efficient progress of the work. The work support information includes a text or an arrow indicating a drilling direction of the bucket 4A, a text or a scale indicating the amount of drilling (OO m), warning information such as a text or an icon for calling operator's attention, or the like. The relevant information refers to information that is not directly relevant to work, such as a date, a time, fuel, and the like.

A vehicle body controller 81 shown in FIG. 4 generally controls the construction machine 1. The construction machine 1 is provided with a display section 82 such as a liquid crystal display device or an organic electro luminescence (EL) display device (not shown in FIGS. 1 to 3).

Figure 5:
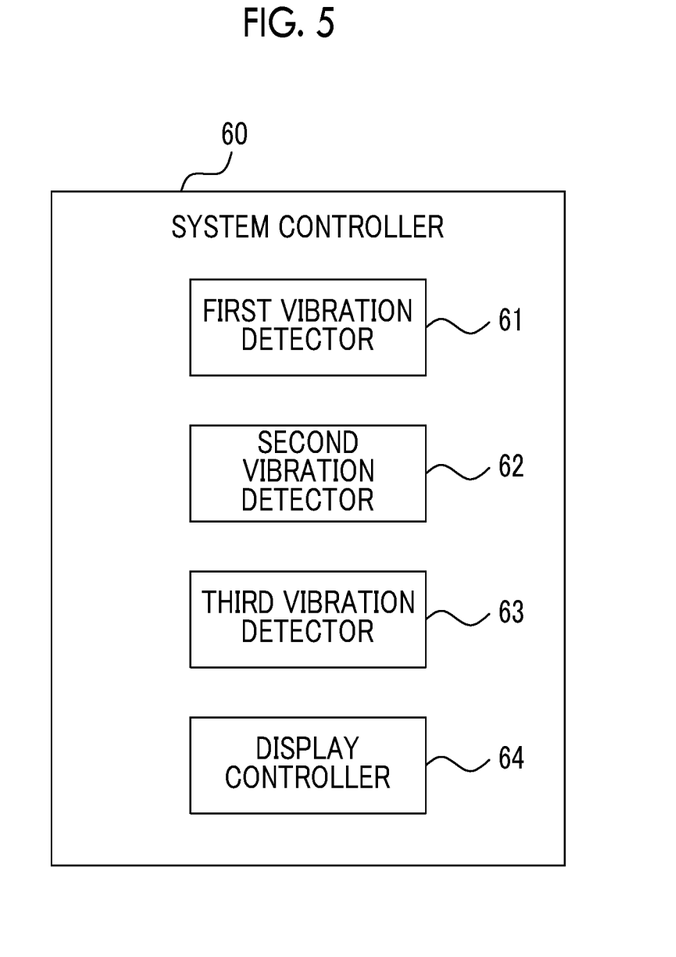
FIG. 5 is a functional block diagram of a system controller 60 shown in FIG. 4.

FIG. 5 is a functional block diagram of the system controller 60 shown in FIG. 4.

The system controller 60 includes a first vibration detector 61, a second vibration detector 62, a third vibration detector 63, and a display controller 64. The first vibration detector 61, the second vibration detector 62, the third vibration detector 63, and the display controller 64 are functional blocks formed as the processor of the system controller 60 executes a program including a control program of the projection type display device stored in the ROM.

The first vibration detector 61 detects a vibration in the first direction X applied to the combiner 12, on the basis of information on the acceleration in the first direction X detected by the triaxial acceleration sensor 12B.

In this specification, information detected as a vibration of an object includes a frequency and an amplitude of the vibration. The frequency of the vibration may be calculated by a change in the size of acceleration information output in a time series manner. The amplitude of the vibration is calculated through computation using the frequency of the vibration and the acceleration information.

Further, the first vibration detector 61 detects a vibration in the second direction Y applied to the combiner 12, on the basis of information on the acceleration in the second direction Y detected by the triaxial acceleration sensor 12B.

In addition, the first vibration detector 61 detects a vibration in the third direction Z applied to the combiner 12, on the basis of information on the acceleration in the third direction Z detected by the triaxial acceleration sensor 12B.

The second vibration detector 62 detects a vibration in the first direction X applied to the projection display section 50, on the basis of information on the acceleration in the first direction X detected by the triaxial acceleration sensor 80.

The second vibration detector 62 detects a vibration in the second direction Y applied to the projection display section 50, on the basis of information on the acceleration in the second direction Y detected by the triaxial acceleration sensor 80.

In addition, the second vibration detector 62 detects a vibration in the third direction Z applied to the projection display section 50, on the basis of information on the acceleration in the third direction Z detected by the triaxial acceleration sensor 80.

The third vibration detector 63 detects a third vibration (relative vibration) of the projection display section 50 with respect to the combiner 12, on the basis of the first vibration detected by the first vibration detector 61 and the second vibration detected by the second vibration detector 62.

The third vibration detector 63 detects a third vibration in the first direction X on the basis of the first vibration and the second vibration in the first direction X, detects a third vibration in the second direction Y on the basis of the first vibration and the second vibration in the second direction Y, and detects a third vibration in the third direction Z on the basis of the first vibration and the second vibration in the third direction.

The display controller 64 controls image information input to the drive section 45, to control an image to be displayed by the projection display section 50. Further, the display controller 64 changes a display format of content to be displayed by the projection display section 50 on the basis of the third vibration detected by the third vibration detector 63.

A plurality of display formats may be provided as the display format of the content displayed by the projection display section 50. Hereinafter, an example in which a first display format and a second display format are exchangeable will be described.

The second display format is a display format with a visibility in vibration higher than that of the first display format. The display format with a high visibility refers to a display format in which in a case where displayed content vibrates, an observer who observes the content does not easily feel fatigue or discomfort or can easily recognize details of the content, which is determined on the basis of ergonomics, for example.

Figure 6:
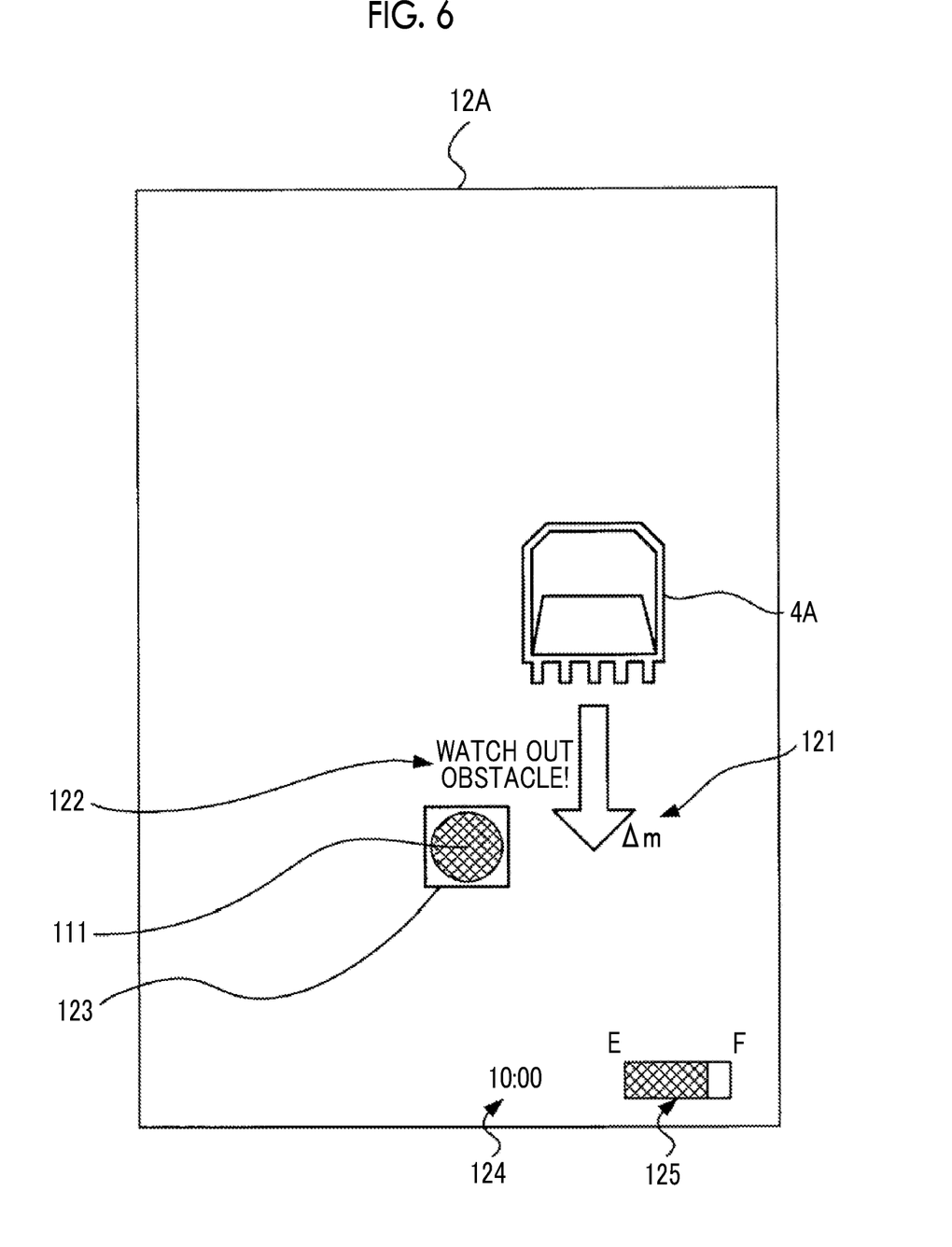
FIG. 6 is a diagram showing an example in which content is displayed in a first display format by a projection display section 50.

FIG. 6 is a diagram showing an example in which content is displayed in the first display format by the projection display section 50.

As shown in FIG. 6, the bucket 4A and an obstacle 111 such as a human are observed from an operator through the projection range 12A of the combiner 12. Further, pieces of content 121 to 125 are displayed in the projection range 12A.

The content 121 is formed of an arrow image indicating a movement direction (downward direction) of the bucket 4A and a text image indicating the amount of drilling (A m).

The content 122 is a text image for warning the operator.

The content 123 is a frame image that surrounds the obstacle 111 for notifying the operator of the position of the obstacle 111.

The content 124 is a text image indicating a current time.

The content 125 is an icon image indicating a state of fuel of the construction machine 1. "E" in the icon image is a character indicating a state where there is no fuel, and "F" is a character indicating a state where fuel is full.

Figure 7:
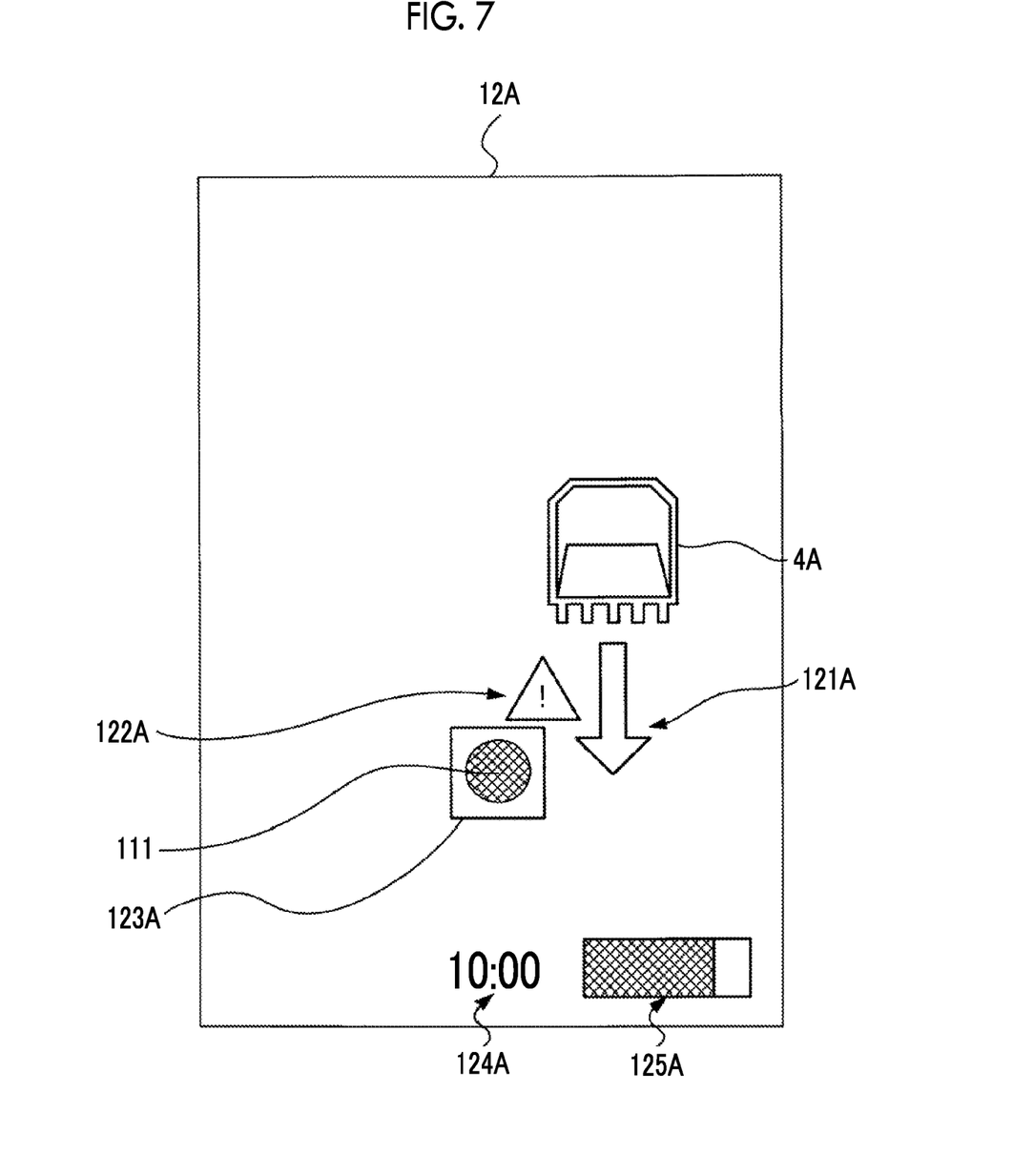
FIG. 7 is a diagram showing an example in which content is displayed in a second display format by a projection display section 50.

FIG. 7 is a diagram showing an example in which content is displayed in the second display format by the projection display section 50.

As shown in FIG. 7, the content 121 shown in FIG. 6 is changed to content 121A in the second display format. The content 121A is formed of only an arrow image, without a text image indicating the amount of drilling. A text image is not easily readable in vibration, and thus, its visibility deteriorates. In the content 121A, since the text image is removed, the visibility is enhanced.

The content 122 shown in FIG. 6 is changed to content 122A in the second display format. The content 122A is formed of an icon image indicating a warning. A text image is not easily readable in vibration, and thus, its visibility deteriorates. In the content 122A, since the text image is changed to the icon image, the visibility is enhanced.

The content 123 shown in FIG. 6 is changed to content 123A in the second display format. The content 123A is formed so that the size of a frame image with respect to the obstacle 111 is larger than that in the first display format. As the frame image becomes large, a gap between the frame image and the obstacle 111 becomes large. Thus, in a case where the content 123A vibrates, visibility of the content 123A is enhanced.

The content 124 shown in FIG. 6 is changed to content 124A in the second display format. The content 124A is formed so that a text font size is enlarged more than that in the first display format. In a case where a text has a small font size, the text is not easily readable due to vibration, but in a case where a text has a large font size, the text is easily readable even in a case where vibration occurs, and thus, visibility is enhanced.

The content 125 shown in FIG. 6 is changed to content 125A in the second display format. The content 125A is formed so that its size is enlarged more than that in the first display format and the texts of "E" and "F" are removed. In this way, as the icon image is enlarged and texts are removed, visibility is enhanced.

Although not shown in FIG. 7, for example, in the content 121A, the content 122A, or the content 123A, by setting the thickness of a contour of each image to be larger than that in the first display format, it is also possible to enhance the visibility.

Further, in the second display format, the content 121A or the content 122A may be displayed to be distantly separated from the bucket 4A compared with the case of the first display format. Thus, even in a case where the content 121A or the content 122A vibrates up and down, for example, it is possible to prevent the content 121A or the content 122A from overlapping with and the bucket 4A, thereby enhancing the visibility of the content.

Figure 8:
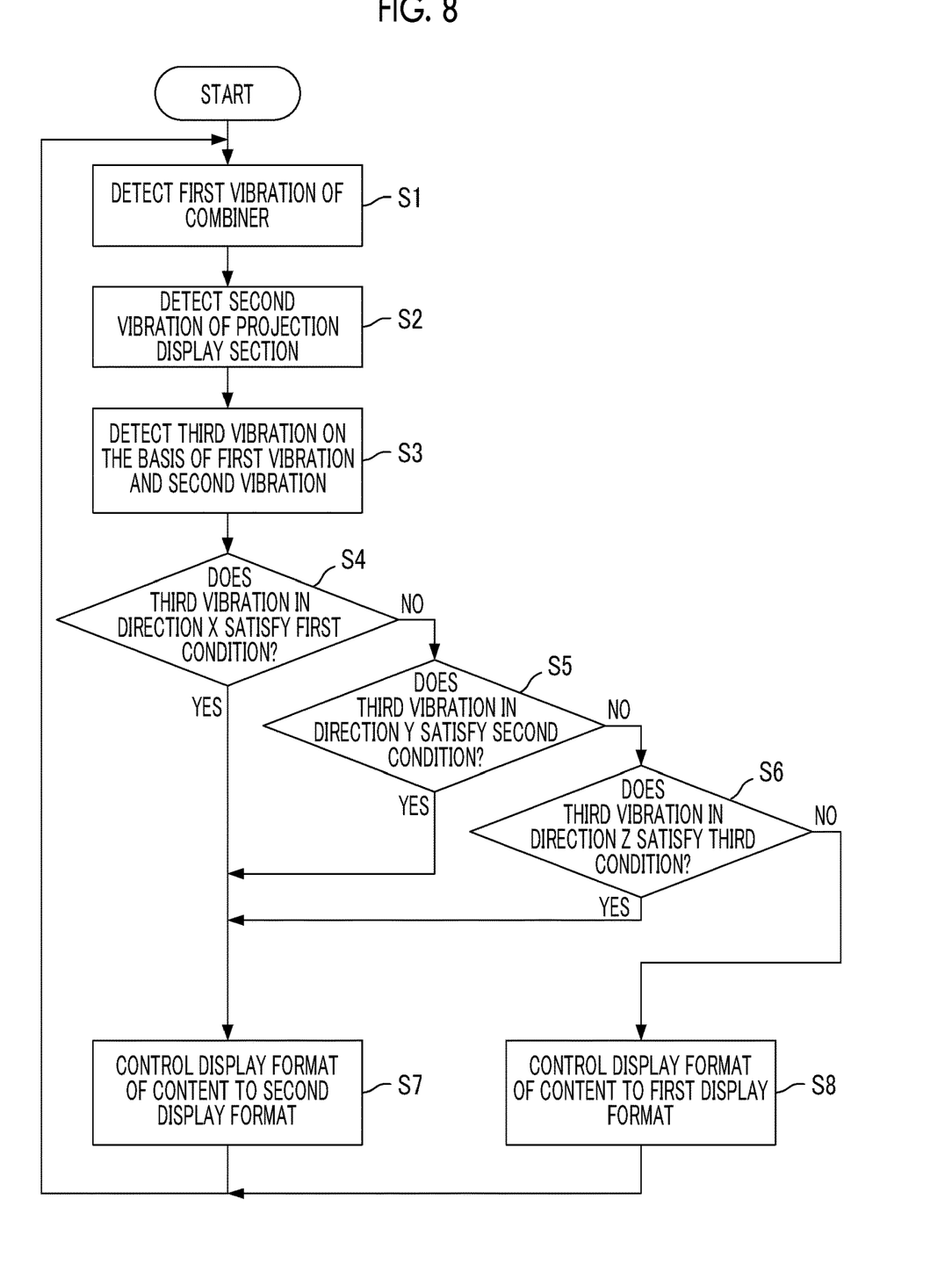
FIG. 8 is a flowchart for illustrating an operation of the HUD 100.

FIG. 8 is a flowchart for illustrating an operation of the HUD 100.

In a case where the HUD 100 is started, the first vibration detector 61 acquires acceleration information from the triaxial acceleration sensor 12B, and detects a first vibration (including a vibration in the first direction X, a vibration in the second direction Y, and a vibration in the third direction Z) of the combiner 12 on the basis of the acquired acceleration information (step S1).

Further, the second vibration detector 62 acquires acceleration information from the triaxial acceleration sensor 80, and detects a second vibration (including a vibration in the first direction X, a vibration in the second direction Y, and a vibration in the third direction Z) of the projection display section 50 on the basis of the acquired acceleration information (step S2).

In addition, the third vibration detector 63 detects a third vibration (including a vibration in the first direction X, a vibration in the second direction Y, and a vibration in the third direction Z) of the projection display section 50 with respect to the combiner 12 on the basis of the first vibration detected in step S1 and the second vibration detected in step S2 (step S3).

Then, the display controller 64 determines whether the third vibration in the first direction X detected in step S3 satisfies a first condition (step S4). The first condition is a condition in which content is visually recognized so that a sense of resolution of the content deteriorates more considerably than that in a case where there is no vibration, and specifically, is a condition in which a frequency of vibration is equal to or greater than a frequency threshold and an amplitude of the vibration is equal to or greater than an amplitude threshold.

In a case where the third vibration applied in the first direction X does not satisfy the first condition (NO in step S4), the display controller 64 determines whether the third vibration in the second direction Y detected in step S3 satisfies a second condition (step S5). The second condition is the same as the first condition.

In a case where the third vibration applied in the second direction Y does not satisfy the second condition (NO in step S5), the display controller 64 determines whether the third vibration in the third direction Z detected in step S3 satisfies a third condition (step S6). The third condition is the same as the first condition. The first condition, the second condition, and the third condition form predetermined conditions.

In a case where the third vibration applied in the third direction Z does not satisfy the third condition (NO in step S6), the display controller 64 controls the display format of the content to be displayed by the projection display section 50 to the first display format (step S8).

On the other hand, in a case where the third vibration applied in the first direction X satisfies the first condition (YES in step S4), in a case where the third vibration applied in the second direction Y satisfies the second condition (YES in step S5), or in a case where the third vibration applied in the third direction Z satisfies the third condition (YES in step S6), the display controller 64 controls the display format of the content to be displayed by the projection display section 50 to the second display format (step S7).

After step S7 and step S8, the procedure returns to step S1, and during the operation of the HUD 100, the above-mentioned processes are repeated.

As described above, according to the HUD 100, it is possible to display content by performing exchange between the first display format in which the amount of information is prioritized and the second display format in which visibility is prioritized, on the basis of information (frequency and amplitude) on vibration of the projection display section 50 with respect to the combiner 12. Thus, even in a situation where the construction machine 1 considerably vibrates, it is possible to enhance visibility of content.

In this embodiment, the first condition, the second condition, and the third condition are the same conditions, but may be different conditions, or two among the three conditions and the remaining one may be different from each other.

Humans are sensitive to a sense of resolution of a display image in a horizontal direction more than that in a vertical direction. Accordingly, by setting the first condition relating to the third vibration in the first direction X as a condition that is stricter than the second condition and the third condition (for example, by setting the amplitude threshold as a lower value), it is possible to enhance visibility of content.

Further, in a case where the amplitude of the third vibration applied in the second direction Y is large, a distance from an operator to content to be displayed is changed. With respect to a vibration in a depth direction of the content to be displayed, it is considered that an influence on the sense of resolution of the content is small. Accordingly, by setting the second condition relating to the third vibration in the second direction Y as a condition that is smoother than the first condition and the third condition (for example, by setting the amplitude threshold as a higher value), it is possible to reduce a switching frequency of the display formats, and as a result, it is possible to enhance visibility of content.

Further, an optical member disposed at a rear stage with reference to the light modulation element 44 among the optical members that form the projection display section 50 is supported by the housing 30, but a direction in which the optical member easily vibrates is determined according to which portion the optical member is supported by.

For example, a configuration in which the magnifier 49 is supported at both end portions in the first direction X is assumed. In this configuration, the magnifier 49 does not easily vibrate with respect to the vibration in the first direction X, but vibrates in the second direction Y more easily than in the first direction X. Accordingly, by setting the condition relating to the third vibration in the second direction Y as a condition that is stricter than the first condition (for example, by setting the amplitude threshold as a lower value), it is possible to enhance visibility of content.

Further, in FIG. 8, in a case where the determination in step S4 is YES, the procedure may not directly proceed to step S7, and instead, in a case where the frequency of the YES determination in step S4 or a period of time during which the determination of step S4 continuously is YES exceeds a threshold, the procedure may proceed to step S7. Thus, it is possible to prevent a display format of content from being frequently changed due to a slight change of vibration, to thereby enhance visibility of the content.

For the same reason, in a case where the determination of step S5 is YES, the procedure may not directly proceed to step S7, and instead, in a case where the frequency of the YES determination in step S5 or a period of time during which the determination of step S5 continuously is YES exceeds a threshold, the procedure may proceed to step S7.

For the same reason, in a case where the determination of step S6 is YES, the procedure may not directly proceed to step S7, and instead, in a case where the frequency of the YES determination in step S6 or a period of time during which the determination of step S6 continuously is YES exceeds a threshold, the procedure may proceed to step S7.

Further, in a case where the amplitude of the third vibration in the first direction X and the amplitude of the third vibration in the third direction Z detected in step S3 exceed a value that is sufficiently larger than the amplitude threshold, the display controller 64 may stop projection of image light in the projection display section 50 to stop display of a virtual image. In this way, it is possible to prevent an operator from suffering from visually induced motion sickness, to thereby enhance work efficiency.

Further, in a case where the display of the virtual image is stopped, it is preferable that the display controller 64 causes the display section 82 to display an image based on the image information through the vehicle body controller 81. Thus, it is possible to continuously provide work support information or the like to the operator, to thereby prevent decrease in work efficiency.

Further, in a case where the content is displayed in the second display format in step S7, and in a case where the amplitude of the third vibration in the first direction X or the amplitude of the third vibration in the third direction Z detected in step S3 exceeds a threshold, it is preferable that the display controller 64 continuously moves the content in a direction where the third vibration in the first direction X or the third direction Z is negated to display the content.

For example, in the display example shown in FIG. 7, in a case where it is detected that the content 121A is moved in a lateral direction by the threshold at a predetermined frequency, by repeating a process of moving the content 121A rightward by the threshold with respect to an original display position to display the content 121A at a timing when the content 121A is moved leftward and moving the content 121A leftward by the threshold with respect to the original display position to display the content 121A at a timing when the content 121A is moved rightward, it is possible to negate the vibration of the content 121A.

As described above, by changing the first display format to the second display format and continuously moving content in a direction where vibration is negated to display the content, it is possible to further enhance visibility of the content when the vibration is applied to the construction machine 1.

Further, in a case where a certain determination in steps 4, 5, and 6 is YES and the amplitude of the third vibration in the first direction X or the amplitude of the third vibration in the third direction Z detected in step S3 exceeds a threshold, the display controller 64 may cause the projection display section 50 to display information for urging confirmation of an installation state of the combiner 12 (for example, a text image of "Please, confirm a combiner mounting state.").

It may be considered that one reason why the amplitude of the third vibration becomes extremely large is because the combiner 12 is not favorably mounted with respect to the combiner mounting part 15. For this reason, in this case, by causing an operator to confirm the installation state of the combiner 12, it is possible to remove a cause of vibration of the combiner 12, to thereby enhance visibility of content.

In the above description, a configuration in which vibration in three directions of the projection display section 50 with respect to the combiner 12 is detected by the triaxial acceleration sensor 12B and the triaxial acceleration sensor 80 is shown, but a configuration in which in detecting the vibration of the projection display section 50 with respect to the combiner 12, a vibration in one direction among three directions is detected may be used. In this case, similarly, it is possible to perform exchange between display formats of content, to thereby enhance visibility in a case where the vibration is large.

Further, a configuration in which an acceleration sensor is used for detection of vibration of the combiner 12 and vibration of the projection display section 50 is shown, but a configuration in which vibration is more specifically detected using an acceleration sensor and an angular velocity sensor may be used.

As described above, the following configurations are disclosed in this specification.

(1) There is disclosed a projection type display device includes: a projection display section that includes a light modulator that spatially modulates light emitted from a light source on the basis of input image information, and projects image light obtained through spatial modulation using the light modulator onto a combiner that is provided in a vehicle to display an image based on the image light; a first vibration detector that detects a first vibration of the combiner; a second vibration detector that detects a second vibration of the projection display section; a third vibration detector that detects a third vibration of the projection display section with respect to the combiner on the basis of the first vibration and the second vibration; and a display controller that controls the image information input to the light modulator to control the image to be displayed by the projection display section, in which the display controller changes a display format of content to be displayed by the projection display section on the basis of the third vibration.

(2) In the projection type display device according to (1), in a case where the third vibration satisfies a predetermined condition, the display controller changes the display format of the content to a display format with a visibility higher than a visibility of a display format of the content in a case where the third vibration does not satisfy the condition.

(3) In the projection type display device according to (2), the first vibration detector detects the first vibration in each of a first direction, a second direction, and a third direction, on the basis of acceleration information in each of the first direction, the second direction, and the third direction detected by a triaxial acceleration sensor fixed to the combiner, in which the second vibration detector detects the second vibration in each of the first direction, the second direction, and the third direction, on the basis of acceleration information in each of the first direction, the second direction, and the third direction detected by a triaxial acceleration sensor fixed to a housing including the projection display section, the third vibration detector detects the third vibration in the first direction on the basis of the first vibration and the second vibration in the first direction, detects the third vibration in the second direction on the basis of the first vibration and the second vibration in the second direction, and detects the third vibration in the third direction on the basis of the first vibration and the second vibration in the third direction, the condition includes a first condition relevant to the third vibration in the first direction, a second condition relevant to the third vibration in the second direction, and a third condition relevant to the third vibration in the third direction, at least one condition among the first condition, the second condition, and the third condition is different from other conditions among the first condition, the second condition, and the third condition, and the display controller changes the display format of the content in a case where the third vibration in the first direction satisfies the first condition, in a case where the third vibration in the second direction satisfies the second condition, or in a case where the third vibration in the third direction satisfies the third condition.

(4) In the projection type display device according to any one of (1) to (3), in a case where an amplitude of the third vibration exceeds a threshold, the display controller continuously moves the content to be displayed by the projection display section in a direction where the third vibration is negated to display the content.

(5) In the projection type display device according to any one of (1) to (3), in a case where an amplitude of the third vibration exceeds a threshold, the projection display section displays information for urging confirmation of a mounting state of the combiner.

(6) There is disclosed a control method of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, includes: a first vibration detection step of detecting a first vibration of the combiner; a second vibration detection step of detecting a second vibration of the projection display section; a third vibration detection step of detecting a third vibration of the projection display section with respect to the combiner on the basis of the first vibration and the second vibration; and a display control step of controlling the image information input to the light modulator to control the image to be displayed by the projection display section, in which in the display control step, a display format of content to be displayed by the projection display section is changed on the basis of the third vibration.

(7) In the control method of the projection type display device according to (6), in the display control step, in a case where the third vibration satisfies a predetermined condition, the display format of the content is changed to a display format with a visibility higher than a visibility of a display format of the content in a case where the third vibration does not satisfy the condition.

(8) In the control method of the projection type display device according to (7), in the first vibration detection step, the first vibration in each of a first direction, a second direction, and a third direction is detected on the basis of acceleration information in each of the first direction, the second direction, and the third direction detected by a triaxial acceleration sensor fixed to the combiner, in the second vibration detection step, the second vibration in each of the first direction, the second direction, and the third direction is detected on the basis of acceleration information in each of the first direction, the second direction, and the third direction detected by a triaxial acceleration sensor fixed to a housing including the projection display section, in the third vibration detection step, the third vibration in the first direction is detected on the basis of the first vibration and the second vibration in the first direction, the third vibration in the second direction is detected on the basis of the first vibration and the second vibration in the second direction, and the third vibration in the third direction is detected on the basis of the first vibration and the second vibration in the third direction, the condition includes a first condition relevant to the third vibration in the first direction, a second condition relevant to the third vibration in the second direction, and a third condition relevant to the third vibration in the third direction, at least one condition among the first condition, the second condition, and the third condition is different from other conditions among the first condition, the second condition, and the third condition, and in the display control step, the display format of the content is changed in a case where the third vibration in the first direction satisfies the first condition, in a case where the third vibration in the second direction satisfies the second condition, or in a case where the third vibration in the third direction satisfies the third condition.

(9) In the control method of the projection type display device according to any one of (6) to (8), in the display control step, in a case where an amplitude of the third vibration exceeds a threshold, the content to be displayed by the projection display section is continuously moved in a direction where the third vibration is negated to be displayed.

(10) In the control method of the projection type display device according to any one of (6) to (8), in the display control step, in a case where an amplitude of the third vibration exceeds a threshold, the projection display section displays information for urging confirmation of a mounting state of the combiner.

(11) There is disclosed a non-transitory computer readable medium storing a control program of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, causes a computer to execute: a first vibration detection step of detecting a first vibration of the combiner; a second vibration detection step of detecting a second vibration of the projection display section; a third vibration detection step of detecting a third vibration of the projection display section with respect to the combiner on the basis of the first vibration and the second vibration; and a display control step of controlling the image information input to the light modulator to control the image to be displayed by the projection display section, in which in the display control step, a display format of content to be displayed by the projection display section is changed on the basis of the third vibration.

According to the invention, it is possible to provide a projection type display device, a control method of the projection type display device, and a computer readable medium storing a control program of the projection type display device, capable of continuously using a vehicle in a case where the vehicle vibrates, and capable of performing optimal display depending on the vibration.

As described above, the invention has been described with reference to specific embodiments, but the invention is not limited to the embodiments, and a variety of modifications may be made in a range without departing from the technical concept of the invention.

This application is based on Japanese Patent Application No. 2016-248112, filed on Dec. 21, 2016, the disclosure of which is incorporated herein by reference.

EXPLANATION OF REFERENCES

100: HUD
1: construction machine
2: lower traveling body
3: upper revolving body
4: front working part
4A: bucket
4B: boom
4C: arm
5: operator cab
6: cab seat
7: operator
10: projection unit
11: front windshield
12: combiner
12A: projection range
12B: triaxial acceleration sensor
13: right side pillar
15: combiner mounting part
21: right side windshield
22: left side windshield
23: left operation lever
24: right operation lever
30: housing
30A: opening
40: light source unit
40A: light source controller
41$r$: R light source
41$g$: G light source
41$b$: B light source
42$r$, 42$g$, 42$b$: collimator lens
43: dichroic prism
44: light modulation element
45: drive section
46: projection optical system
47: diffuser
48: reflecting mirror
49: magnifier
50: projection display section
60: system controller
61: first vibration detector
62: second vibration detector
63: third vibration detector
64: display controller
70: storage
80: triaxial acceleration sensor
81: vehicle body controller
82: display section
111: obstacle
121, 122, 123, 124, 125: content (first display format)
121A, 122A, 123A, 124A, 125A: content (second display format)

What is claimed is:

1. A projection type display device comprising:
a projection display section that includes a light modulator that spatially modulates light emitted from a light source on the basis of input image information, and projects image light obtained through spatial modulation using the light modulator onto a combiner that is provided in a vehicle to display an image based on the image light;
a first vibration detector that detects a first vibration of the combiner;
a second vibration detector that detects a second vibration of the projection display section;
a third vibration detector that detects a third vibration of the projection display section with respect to the combiner on the basis of the first vibration and the second vibration; and
a display controller that controls the image information input to the light modulator to control the image to be displayed by the projection display section,
wherein the display controller changes a display format of content to be displayed by the projection display section on the basis of the third vibration.

2. The projection type display device according to claim 1,
wherein in a case where the third vibration satisfies a predetermined condition, the display controller changes the display format of the content to a display format with a visibility higher than a visibility of a display format of the content in a case where the third vibration does not satisfy the condition.

3. The projection type display device according to claim 2,
wherein the first vibration detector detects the first vibration in each of a first direction, a second direction, and a third direction, on the basis of acceleration information in each of the first direction, the second direction, and the third direction detected by a triaxial acceleration sensor fixed to the combiner,
wherein the second vibration detector detects the second vibration in each of the first direction, the second direction, and the third direction, on the basis of acceleration information in each of the first direction, the second direction, and the third direction detected by a triaxial acceleration sensor fixed to a housing including the projection display section,
wherein the third vibration detector detects the third vibration in the first direction on the basis of the first vibration and the second vibration in the first direction, detects the third vibration in the second direction on the basis of the first vibration and the second vibration in the second direction, and detects the third vibration in the third direction on the basis of the first vibration and the second vibration in the third direction,
wherein the condition includes a first condition relevant to the third vibration in the first direction, a second condition relevant to the third vibration in the second direction, and a third condition relevant to the third vibration in the third direction,
wherein at least one condition among the first condition, the second condition, and the third condition is different from other conditions among the first condition, the second condition, and the third condition, and
wherein the display controller changes the display format of the content in a case where the third vibration in the first direction satisfies the first condition, in a case where the third vibration in the second direction satisfies the second condition, or in a case where the third vibration in the third direction satisfies the third condition.

4. The projection type display device according to claim 3,
wherein in a case where an amplitude of the third vibration exceeds a threshold, the display controller continuously moves the content to be displayed by the projection display section in a direction where the third vibration is negated to display the content.

5. The projection type display device according to claim 2,
wherein in a case where an amplitude of the third vibration exceeds a threshold, the display controller continuously moves the content to be displayed by the projection display section in a direction where the third vibration is negated to display the content.

6. The projection type display device according to claim 2,
wherein in a case where an amplitude of the third vibration exceeds a threshold, the display controller causes the projection display section to display information for urging confirmation of a mounting state of the combiner.

7. The projection type display device according to claim 3,
wherein in a case where an amplitude of the third vibration exceeds a threshold, the display controller causes the projection display section to display information for urging confirmation of a mounting state of the combiner.

8. The projection type display device according to claim 1,
wherein in a case where an amplitude of the third vibration exceeds a threshold, the display controller continuously moves the content to be displayed by the projection display section in a direction where the third vibration is negated to display the content.

9. The projection type display device according to claim 1,
wherein in a case where an amplitude of the third vibration exceeds a threshold, the display controller causes the projection display section to display information for urging confirmation of a mounting state of the combiner.

10. A control method of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, the method comprising:
a first vibration detection step of detecting a first vibration of the combiner;
a second vibration detection step of detecting a second vibration of the projection display section;
a third vibration detection step of detecting a third vibration of the projection display section with respect to the combiner on the basis of the first vibration and the second vibration; and
a display control step of controlling the image information input to the light modulator to control the image to be displayed by the projection display section,
wherein in the display control step, a display format of content to be displayed by the projection display section is changed on the basis of the third vibration.

11. The control method of the projection type display device according to claim 10,
wherein in the display control step, in a case where the third vibration satisfies a predetermined condition, the display format of the content is changed to a display format with a visibility higher than a visibility of a display format of the content in a case where the third vibration does not satisfy the condition.

12. The control method of the projection type display device according to claim 11,
wherein in the first vibration detection step, the first vibration in each of a first direction, a second direction, and a third direction is detected on the basis of acceleration information in each of the first direction, the second direction, and the third direction detected by a triaxial acceleration sensor fixed to the combiner,
wherein in the second vibration detection step, the second vibration in each of the first direction, the second direction, and the third direction is detected on the basis of acceleration information in each of the first direction, the second direction, and the third direction detected by a triaxial acceleration sensor fixed to a housing including the projection display section, wherein in the third vibration detection step, the third vibration in the first direction is detected on the basis of the first vibration and the second vibration in the first direction, the third vibration in the second direction is detected on the basis of the first vibration and the second vibration in the second direction, and the third vibration in the third direction is detected on the basis of the first vibration and the second vibration in the third direction, wherein the condition includes a first condition relevant to the third vibration in the first direction, a second condition relevant to the third vibration in the second direction, and a third condition relevant to the third vibration in the third direction, wherein at least one condition among the first condition, the second condition, and the third condition is different from other conditions among the first condition, the second condition, and the third condition, and wherein in the display control step, the display format of the content is changed in a case where the third vibration in the first direction satisfies the first condition, in a case where the third vibration in the second direction satisfies the second condition, or in a case where the third vibration in the third direction satisfies the third condition.

13. The control method of the projection type display device according to claim 12,
wherein in the display control step, in a case where an amplitude of the third vibration exceeds a threshold, the content to be displayed by the projection display section is continuously moved in a direction where the third vibration is negated to be displayed.

14. The control method of the projection type display device according to claim 11,
wherein in the display control step, in a case where an amplitude of the third vibration exceeds a threshold, the content to be displayed by the projection display section is continuously moved in a direction where the third vibration is negated to be displayed.

15. The control method of the projection type display device according to claim 11,
wherein in the display control step, in a case where an amplitude of the third vibration exceeds a threshold, the projection display section displays information for urging confirmation of a mounting state of the combiner.

16. The control method of the projection type display device according to claim 12,
wherein in the display control step, in a case where an amplitude of the third vibration exceeds a threshold, the projection display section displays information for urging confirmation of a mounting state of the combiner.

17. The control method of the projection type display device according to claim 10,
wherein in the display control step, in a case where an amplitude of the third vibration exceeds a threshold, the content to be displayed by the projection display section is continuously moved in a direction where the third vibration is negated to be displayed.

18. The control method of the projection type display device according to claim 10,
wherein in the display control step, in a case where an amplitude of the third vibration exceeds a threshold, the projection display section displays information for urging confirmation of a mounting state of the combiner.

19. A non-transitory computer readable medium storing a control program of a projection type display device that includes a projection display section that includes a light modulator that spatially modulates light emitted from a light source on the basis of input image information, and projects image light obtained through spatial modulation using the light modulator onto a combiner that is provided in a vehicle to display an image based on the image light, the control program causing a computer to execute:

a first vibration detection step of detecting a first vibration of the combiner;

a second vibration detection step of detecting a second vibration of the projection display section;

a third vibration detection step of detecting a third vibration of the projection display section with respect to the combiner on the basis of the first vibration and the second vibration; and a display control step of controlling the image information input to the light modulator to control the image to be displayed by the projection display section, wherein in the display control step, a display format of content to be displayed by the projection display section is changed on the basis of the third vibration.

* * * * *